United States Patent [19]

Holt

[11] Patent Number: 4,723,879
[45] Date of Patent: Feb. 9, 1988

[54] ELASTOMERIC TRAILER HITCH CUSHION FOR RAILWAY CAR

[75] Inventor: Jan D. Holt, St. Charles County, Mo.

[73] Assignee: ACF Industries, Incorporated, Earth City, Mo.

[21] Appl. No.: 850,297

[22] Filed: Apr. 10, 1986

[51] Int. Cl.$^4$ .............................. B60P 7/16; F16F 5/00
[52] U.S. Cl. ......................................... 410/63; 410/62; 267/141.1
[58] Field of Search ....................... 410/56, 60, 62, 63; 188/129, 271; 267/140.4, 141.1; 213/40 R, 41, 44, 45

[56] References Cited

U.S. PATENT DOCUMENTS

| | | | |
|---|---|---|---|
| 3,016,025 | 1/1962 | Clejan | 410/62 X |
| 3,041,028 | 6/1962 | McDowell | 410/62 |
| 3,145,006 | 8/1964 | Robinson et al. | 410/61 |
| 3,164,346 | 1/1965 | Bateson | 410/62 X |
| 3,246,866 | 4/1966 | Price et al. | 410/62 |
| 3,289,987 | 12/1966 | Candlin, Jr. et al. | 410/62 X |
| 3,493,207 | 2/1970 | Ferris et al. | 410/64 |
| 3,493,221 | 2/1970 | Mozdzanowski | 267/141.1 X |
| 3,512,739 | 5/1970 | Powell et al. | 410/63 |
| 3,628,633 | 12/1971 | Meeks | 188/129 X |
| 3,751,020 | 8/1973 | Kendall et al. | 267/33 |
| 4,095,766 | 6/1978 | Hicks et al. | 410/63 |
| 4,095,767 | 6/1978 | Hicks et al. | 410/63 |
| 4,198,037 | 4/1980 | Anderson | 267/153 |
| 4,591,059 | 5/1986 | Hammarlund | 213/32 R |

FOREIGN PATENT DOCUMENTS 1234766 2/1967 Fed. Rep. of Germany ........ 213/45

Primary Examiner—James B. Marbert
Attorney, Agent, or Firm—Polster, Polster and Lucchesi

[57] ABSTRACT

An elastomeric in compression trailer hitch cushion for an over-the-road trailer hitch, as mounted on a railway car, is disclosed so as to cushion against longitudinal loads transmitted between the railroad car and the trailer. This trailer hitch cushion serves as the hitch diagonal strut and it has one end thereof secured to the railway car and its other end secured to the vertical hitch strut, with the diagonal cushioning strut being disposed so as to cushion longitudinal loads in either fore or aft direction and to maintain the vertical strut in vertical position. The cushioning strut comprises a frame, compressible elastomeric cushioning members carried by the frame, and a compression load applying system for compressing the elastomeric members relative to the frame upon a longitudinal load in either fore or aft directions relative to the railroad car being applied to the hitch. The cushion strut comprises a plurality of generally annular-shaped plates of a suitable elastomeric material, each having a center opening, an outer peripheral face, and a pair of generally parallel load bearing faces for transmitting compression forces into the elastomeric plates. These elastomeric plates alternate with a plurality of non-compressible washers, preferably metal washers, with each load bearing face of each elastomeric plate being frictionally engagable with, but being unbonded to, a respective contiguous face of one of the washers.

5 Claims, 7 Drawing Figures

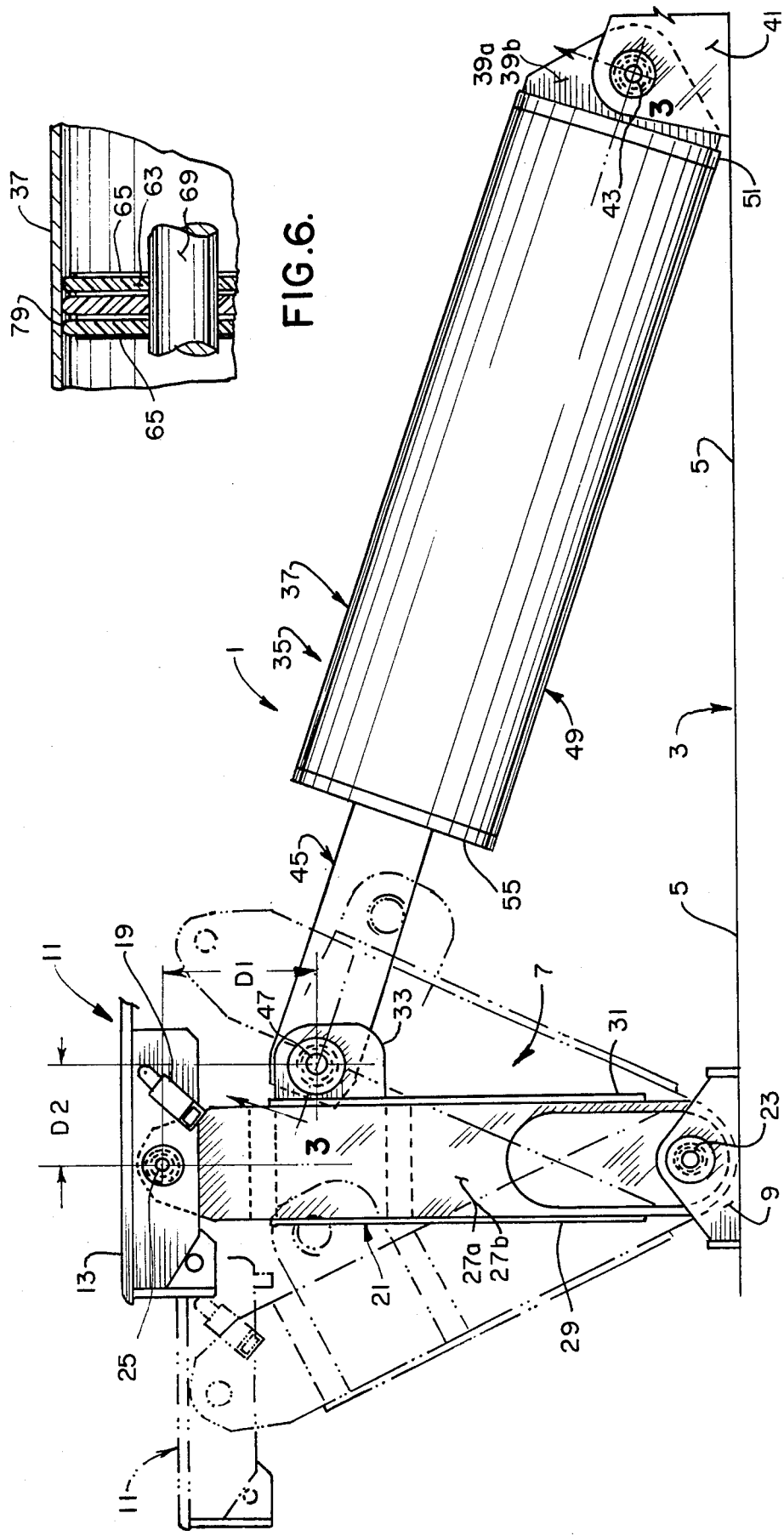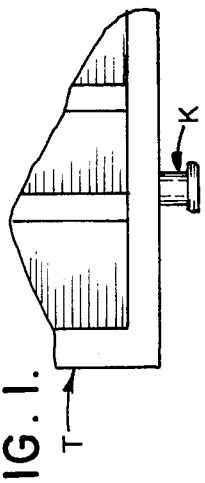

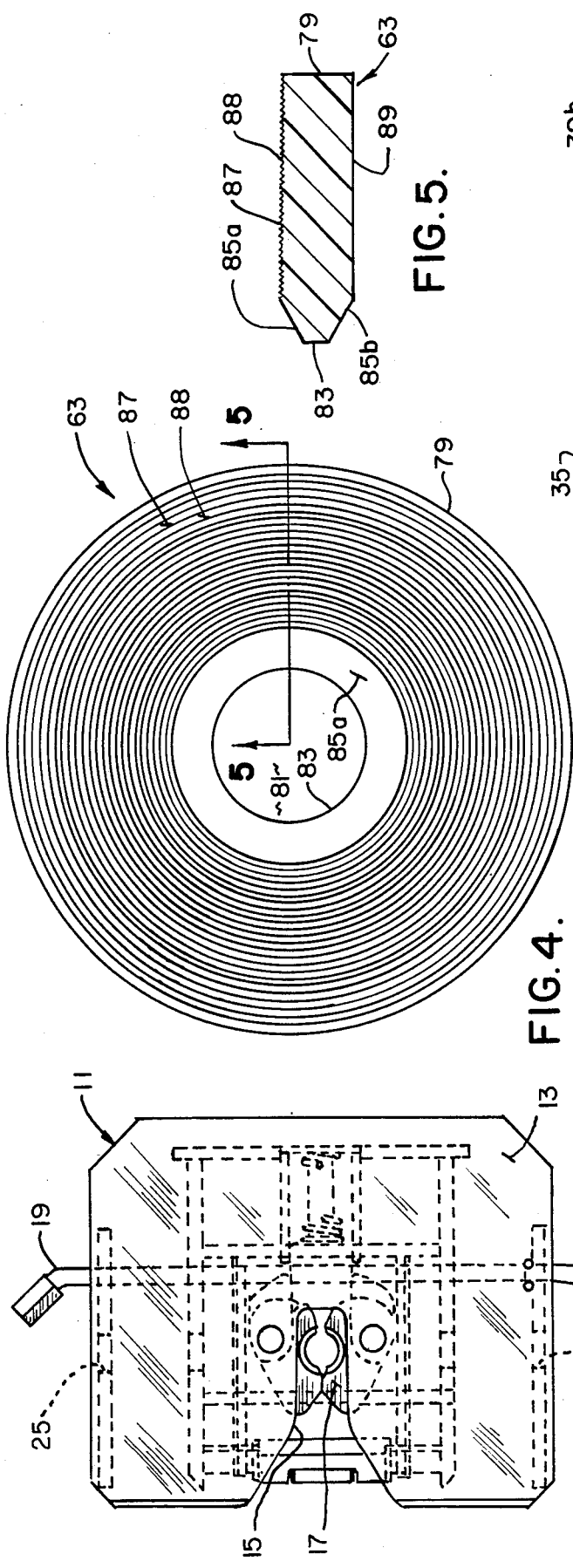
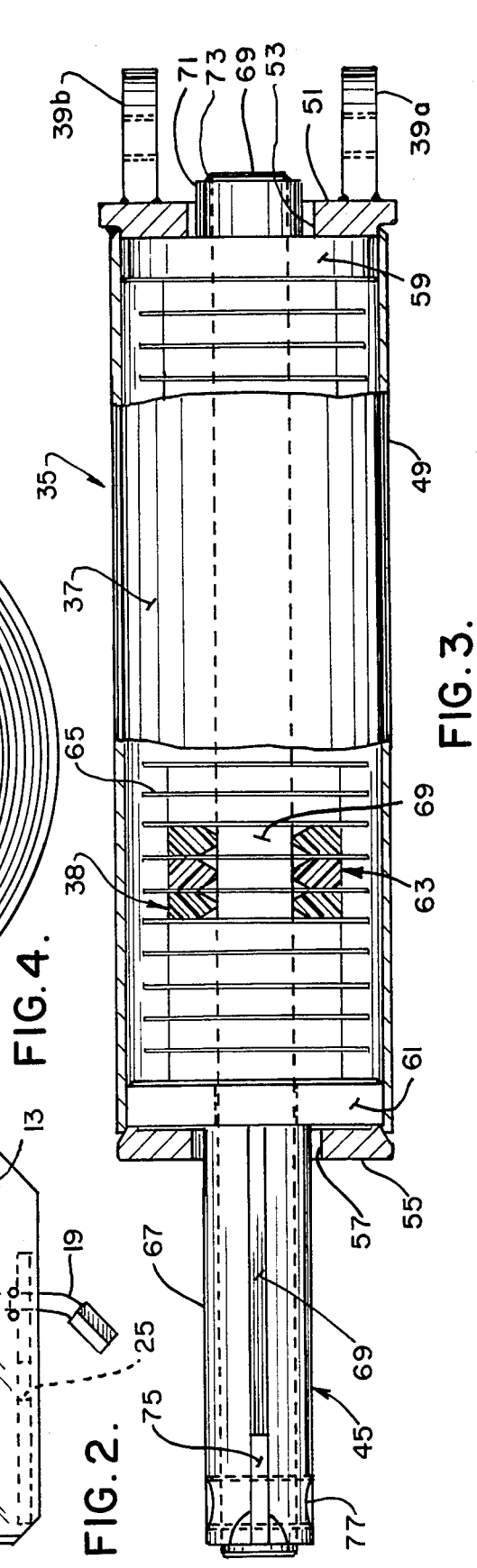
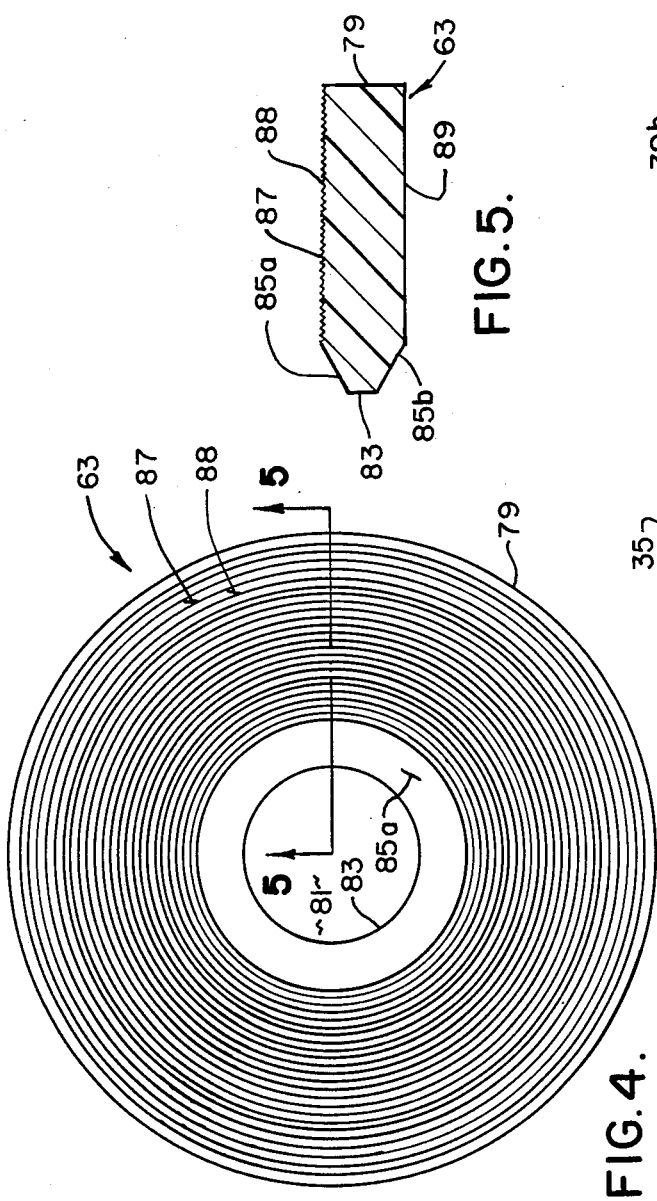

ELASTOMERIC TRAILER HITCH CUSHION FOR RAILWAY CAR

BACKGROUND OF THE INVENTION

This invention relates to a cushioned railway trailer hitch or stanchion, and more specifically to such a hitch in which an elastomeric material in compression is utilized to cushion impact loading between a trailer carried by the railway car and the railway car upon movement of the car in longitudinal direction along the track, and particularly upon abrupt longitudinal accelerations of the car, such as during humping or other switch yard operations.

Generally, it is common for over-the-road trailers to be loaded onto a specially designed railway flat car which accommodates one or more (typically, two) such trailers. This type of railway service is often referred to as intermodal or piggyback service. In such intermodal service, the wheels of an over-the-road trailer support the rear of the trailer on the railway car and the car is provided with a hitch which supports the front of the trailer. Typically, the hitch includes a hitch head which is positioned generally at the height and functions generally the same as a "fifth wheel" on an over-the-road tractor. The trailer has a downwardly extending kingpin on the front of the trailer which is engaged by the hitch head, with the latter capturing the trailer kingpin. Typically, the hitch head includes a locking assembly which is the sole means for securing the trailer to the railway car. Consequently, the hitch must not only securely hold the front of the trailer on the railway car, but the hitch must withstand and resist all inertial or acceleration loads between the railway car and the trailer.

In humping or other switch yard operations, substantial amounts of energy must be transmitted through the hitch between the railway car and the trailer. For example, in a ten-mile per hour impact of the railway car, which may represent a severe impact during actual humping operations or the like, such an impact force requires that the maximum force applied to the trailer kingpin must be limited, in accordance with the Association of American Railroads (AAR) standards so as not to exceed a force of 210,000 pounds. In an effort to minimize such kingpin loading during railway operation, cushioned hitches have been developed. Reference may be made to such U.S. patents as follows for examples of such cushioned hitch arrangements: U.S. Pat. Nos. 3,145,006, 3,246,866, 3,493,207, 3,512,739, 4,095,766, and 4,095,767.

A hitch typically includes a vertical strut and a diagonal strut, both of which are pivotally secured to the railway car. The hitch head is normally pivotally carried on the upper end of the vertical strut. The diagonal strut is typically pivotally secured to the upper end of the vertical strut proximate the hitch head. Certain prior art hitches are movable between a raised or erected position for supporting the forward end of an over-the-road trailer, and a lowered or retracted position in which the hitch is folded onto the floor of the railway car so that a tractor and the trailer may be driven lengthwise onto and from the railway car. In other prior art hitches, the hitch remains erect in its operating position, and the over-the-road trailers are lifted onto and from the car.

In any event, whether the hitch is retractable or is fixed in erected position, the vertical strut of the hitch predominantly supports the weight of the trailer and withstands virtually all of the vertical loads imposed on the hitch during operation. The diagonal strut supports the vertical strut and the hitch in longitudinal (i.e., fore and aft direction with respect to the car) and must withstand substantially all of the longitudinal inertial loads between the railway car and the trailer. In cushioned hitches, an energy dissipating or cushioning system is typically incorporated within the diagonal strut. However, such energy dissipating or cushioning systems may, as shown in U.S. Pat. No. 3,493,207, be incorporated in the hitch base. In any event, these cushioning systems must, in a ten-mile per hour impact, dissipate about 85,000-90,000 foot pounds of energy so as to prevent the load applied to the kingpin of the trailer from exceeding the above-noted 210,000-pound maximum kingpin load limit, as established by AAR regulations.

Generally, two types of cushioning systems for such railway hitches are in general use, namely a hydraulic cushioning unit or an elastomeric unit. Hydraulic cushioning units, such as shown in the co-assigned U.S. Pat. Nos. 3,246,866 and 3,512,739, utilize a hydraulic cylinder filled with a hydraulic fluid or liquid which, upon being subjected to elongation or compression forces, was metered through an appropriate metering orifice, thus dissipating energy and cushioning the trailer against impact loads. While these and other hydraulic cushioning units worked well for their intended purposes, by their nature, they required many machined parts and close tolerances in the hydraulic portion of the cushioning unit. These high tolerance and complex machined surfaces required significant amounts of cost and manpower for fabrication, inspection, and maintenance purposes. Additionally, since hydraulic cushioning units work primarily on the principle of dissipating the momentum of the railway car or trailer through a change in the momentum of the hydraulic fluid within the cushioning unit, the cushioning capability of such hydraulic cushioning units is dependent on the characteristics of the hydraulic fluid. Moreover, for a hydraulic cushioning unit, the force applied to the kingpin of a trailer is a function of the velocity of the hydraulic cushioning unit deflection, and this is a complex functional relationship between a variety of parameters which can result in a different curve of velocity versus strut deflection to be produced for each impact initiation speed.

Reference may also be made to U.S. Pat. Nos. 3,145,006, 3,493,207, 4,905,766, and 4,095,767, which show a compendium of prior art elastomeric cushioning units. More specifically, in U.S. Pat. No. 3,145,006, a trailer hitch is shown in which a rubber in compression energy absorption unit is incorporated in the diagonal strut so as to resist both inward and outward movement thereof. The elastomeric or resilient energy absorption system shown in this last-noted patent is not described in detail, but it is evident from the drawings it is of a construction and method substantially different from that disclosed and claimed herein.

U.S. Pat. No. 3,493,207 discloses a foldable hitch arrangement which, as shown in FIG. 16, utilizes a number of superposed resilient elastomeric pads which are bonded to the adjacent faces of metallic separating plates with a suitable adhesive. These elastomeric members are stressed in shear rather than in compression.

(See column 9, lines 29 et seq of U.S. Pat. No. 3,493,207.)

The co-assigned U.S. Pat. Nos. 4,095,766 and 4,095,767 disclose other types of elastomer-in-shear cushioning units incorporated within the diagonal struts of a hitch. Many various structural arrangements of the elastomer-in-shear and elastomeric energy absorption elements are illustrated in these patents.

However, as can be appreciated in all types of elastomer-in-shear constructions, the energy absorbing characteristics are dependent on the adhesive bond between the elastomeric units and its corresponding shear backing plates. In service, over time, the elastomer-in-shear cushioning units are exposed to the elements, large temperature extremes, and a large variety of solvents and other fluids which tend to weaken the bond between the elastomer members and their backing plates.

It is also known to utilize elastomer-in-compression for energy absorption purposes. For example, in U.S. Pat. No. 3,751,020, assigned to Miner Enterprises, Inc., of Chicago, Ill., a shock absorber is disclosed in which a piston assembly is movable in a chamber to the extent of an air space provided in unresisted fashion by a compressible solid during short strokes of a piston rod, but is resisted by the compressible elastomer solid during long strokes of the piston rod.

In U.S. Pat. No. 4,198,037, also assigned to Miner Enterprises, Inc., an elastomeric compression spring is shown in which a plurality of elastomeric blocks of an annealed copolyester polymer elastomer are bonded to the respective sides of metallic plates interposed therebetween so that upon application of a compression load, the elastomeric members will deform along their peripheral edges. Here again, however, the structural integrity of the elastomeric cushioning unit is dependent on a bonded joint between the elastomeric member and the metal plate adhesively bonded thereto.

There has been a long-standing need for a trailer hitch cushioning apparatus which would be substantially unaffected during a long service life, which would dissipate substantial amounts of energy, and which was not dependent on close tolerance hydraulic parts or on an adhesive joint.

SUMMARY OF THE INVENTION

Among the several objects and features of the present invention may be noted the provision of a elastomeric trailer hitch cushion which utilizes a plurlity of elastomer-in-compression members devoid of any adhesive bond between the elastomeric members and their respective backing plates;

The provision of such an elastomeric trailer hitch cushion which is substantially unaffected by variations in temperature or weather and no bonds subject to failure;

The provision of such an elastomeric trailer hitch cushion which results in a substantially linear relationship between the force dissipated by the cushioning unit and the travel of the cushioning unit such that the increased deflection of the elastomeric cushion resulting in a horizontal excursion of the trailer in fore and aft direction is substantially proportional to an increase in force; and The provision of such an elastomeric hitch cushion which requires considerably less inspection and maintenance than comparable hydraulic cushioning units, which is less expensive to manufacture due to less machining and labor costs, which has a long service life, and which is substantially unaffected by the environment and weather over the course of its service life.

Other objects and features of this invention will be in part apparent and in part pointed out hereinafter.

Briefly stated, this invention relates to cushioning apparatus for an over-the-road trailer hitch mounted on a railway car so as to cushion against longitudinal loads transmitted between the railway car and the trailer secured to the hitch. The trailer has a downwardly extending kingpin. The hitch comprises a generally vertical strut secured to the railway car and a hitch head carried by the vertical strut. The hitch head has means for locking the kingpin to the hitch head. Cushioning apparatus is provided having one end thereof secured to the railway car, and the other end thereof secured to the vertical strut, with the cushioning apparatus being disposed so as to cushion the longitudinal loads between the railway car and the trailer secured to the hitch. The cushioning apparatus comprises a frame, compressible elastomeric means carried by the frame for cushioning the above-noted longitudinal loads between the railway car and the trailer, and means interposed between the vertical strut and the frame for compressing the elastomeric means relative to the frame upon a longitudinal load in either fore or aft direction relative to the railway car being applied to the hitch. The elastomeric means comprises a plurality of generally annular-shaped elastomeric plates, each having a center opening, an outer peripheral surface, and a pair of generally parallel load-bearing faces for transmitting the compression force into the elastomeric member plates. The elastomeric plates alternate with a plurality of non-compressible washers, preferably metal washers, with each of the load-bearing faces of each elastomeric plate being frictionally engageable with, but being unbonded relative to, a respective contiguous face of one of the washers.

BRIEF DESCRIPTION OF THE DRAWINGS

FIG. 1 is a side elevational view of an elastomeric trailer hitch cushioning unit of the present invention mounted on a railway car, with the hitch having a vertical strut and a hitch head carried on the upper end thereof, and with the vertical strut and hitch head being shown in solid lines in its normal vertical position and being shown in phantom line position illustrating the maximum fore and aft movement or excursion of an over-the-road trailer (not shown), secured to the hitch head upon application of a maximum impact load (e.g., 10 mph) applied to the railway car;

FIG. 2 is a top plan view of the hitch head;

FIG. 3 is a partial longitudinal cross sectional view, taken along line 3—3 of FIG. 1, illustrating the construction of the elastomeric cushioning unit of the present invention;

FIG. 4 is a top plan view of an elastomeric unit (in enlarged scale) utilized in the elastomeric cushioning unit shown in FIG. 2;

FIG. 5 is a cross sectional view of the elastomeric member, taken along line 5—5 of FIG. 4;

FIG. 6 is a partial cross sectional view of the elastomeric cushioning unit shown in FIG. 3 illustrating elastomeric plates in a compressed condition extending out beyond their adjacent compression washers; and FIG. 7 is a partial view of the front end of an over-the-road trailer having a downwardly extending kingpin.

Corresponding reference characters indicate corresponding parts throughout the several views of the drawings.

DESCRIPTION OF A PREFERRED EMBODIMENT

Referring now to the drawings, a trailer hitch or stanchion, as generally indicated at 1, is shown to be mounted on an intermodal railway car 3 for securing an over-the-road trailer T (see FIG. 7) to the railway car. In such manner, an over-the-road trailer may be loaded onto a railway car, transported by rail to a distant location, and off-loaded for over-the-road delivery to its final destination.

More specifically, trailer hitch 1 is shown to be mounted on a hitch base plate 5 which may, in fact, be part of railway car 3. Hitch 1 comprises a vertical strut assembly 7 pivotally attached to a vertical strut mount 9 which in turn is carried by hitch base plate 5. A hitch head, as generally indicated at 11, is pivotally carried on the upper end of the vertical strut assembly 7. As shown in FIG. 2, hitch head 11 comprises a hitch plate 13 having a slot 15 therein for receiving the kingpin K (see FIG. 7) of an over-the-road trailer T to be secured to the hitch. Hitch head 11 includes a kingpin locking jaw assembly 17 actuated by a locking mechanism 19, permitting the kingpin of the trailer to be received in the hitch head 11, and to be securely fastened thereto. In this manner, vertical loads from the front end of the trailer are transferred into the hitch head by the hitch plate 13 bearing against a lower surface on the trailer surrounding its kingpin, and horizontal loads are transferred between the hitch assembly and the kingpin via the kingpin locking jaw assembly 17. It will be appreciated that in service, the hitch head 11, and more particularly the kingpin locking jaw assembly 17, secures the trailer to the railway car and effectively transmits longitudinal loads between the railway car and the trailer in fore and aft direction relative to the railway car.

Vertical strut assembly 7 comprises a rigid strut body 21 having its lower end pivotally secured to vertical strut mount 9 by means of pins 23. Upper pins 25 pivotally secure hitch head 11 to the upper end of strut body 21. More specifically, strut body 21 has a pair of spaced strut legs 27a, 27b and has a front plate 29 and a rear plate 31 spanning between strut legs 27a, 27b. A pair of spaced lugs 33 is located on rear plate 31 generally on the longitudinal centerline of the hitch.

In accordance with this invention, an elastomer-in-compression trailer hitch cushioning assembly, constituting a diagonal strut assembly, is indicated in its entirety at reference character 35. This cushioning assembly serves the double function of bracing vertical strut 7 in fore and aft direction and transfering longitudinal loads between the railway car 3 and the over-the-road trailer supported on hitch 1. More specifically, cushioning apparatus 35 cushions impact loading between the railway car and the trailer so, under normally anticipated longitudinal inertial loads, as may be experienced during severe humping and other switch yard operations (e.g., a ten-mile per hour impact), the amount of force exerted on the trailer kingpin is limited to 210,000 pounds or less, in accordance with AAR regulations.

More specifically, cushioning apparatus 35 is shown to comprise a frame or strut body, as generally indicated at 37, and an elastomer-in-compression cushioning assembly, as indicated at 38, carried by frame 37 such that the frame resiliently compresses the cushioning assembly regardless of whether the longitudinal inertial load applied by the railway car to the trailer is either in fore or aft longitudinal direction, thereby to dissipate or cushion the energy transmitted between the railway car and the trailer.

More specifically, frame 37 comprises a pair of spaced body lugs 39a, 39b at the rear end (i.e., right end, as shown in FIG. 1) of cushioning assembly 35 for pivotally mounting the cushioning assembly to a diagonal strut mount 41 by means of a pin 43. A rod assembly, as generally indicated at 45, extends axially from the other end of frame or strut body 37, and is pivotally attached to lugs 33 by a pin 47 so as to compress elastomeric cushioning means 38 within frame 37 upon application of a longitudinal load in either fore or aft direction to cushioning unit 35, as may be occasioned by a longitudinal inertial load being transmitted between the railway car and the trailer supported by hitch 1.

As best shown in FIG. 1, pin 47 coupling rod assembly 45 to lug 33 on vertical strut assembly 7 is vertically offset from pin 25 coupling hitch head 11 to vertical strut assembly 7 by a distance D1. Further, pin 47 is horizontally offset by a distance D2 from the vertical centerline between pins 23 and 25 along the vertical strut when the vertical strut is in its normal, upright position. In accordance with this invention, with the vertical strut connected to mount 9 by pin 23, with diagonal strut connected to mount 41 by pin 43, with the end of rod 45 coupled to lugs 33 by pin 47, and with the offset distances D1 and D2 as above-described, upon application of longitudinal loads to the diagonal strut 35 in either tension or compression deflection of the diagonal strut (i.e., to cause rod 45 to move outwardly or inwardly, respectively, relative to frame 37), the diagonal strut assembly 35 with elastomeric cushioning means 38 therein produces a substantially equal force-moment about pin 23 such that the stresses on vertical strut 7 are substantially equal when the railway car is subjected to an equal impact loading in either fore or aft longitudinal direction. As a result, hitch 1 of the present invention, utilizing cushioning assembly 35, acts against trailer excursions or movement in either fore or aft direction in substantially the same linear manner and so as to have subtantially the same amount of movement upon application of interial loads in either longitudinal direction.

More specifically, frame 37 is shown to comprise a cylindrical body 49 having a rear end cap 51. The rear end cap 51 has a central opening, 53 therethrough for purposes as will appear. A front end cap 55 is secured to the upper or left end (as shown in FIG. 3) of cylinder body 49 and has a central opening 57 through which rod assembly 45 extends. A rear compression plate 59 is disposed within cylinder body 49 so as to bear against the inner face of rear end cap 51. Likewise, a front compression plate 61 is disposed within cylinder body 49 so as to bear against the inner face of front end cap 55. Front and rear compression plates 61 and 59 have respective center openings therethrough for receiving a portion of shaft assembly 45 in a manner as will appear.

In accordance with this invention, elastomeric cushioning assembly 38 comprises a plurality of annular, elastomeric pucks 63 arranged in a column and disposed within cylinder body 49 in such manner that upon application of either a tension or compression load to cushioning apparatus 35, the elastomeric pucks 63 will be compressed between frame 37 and rod assembly 45 so as to cushion or dissipate energy transmitted between the railway car and the trailer in either longitudinal direction. More specifically, elastomeric pucks 63 are shown to alternate with a plurality of non-compressible, metallic washers 65. The elastomeric pucks 63 are free of (i.e., unbonded) relative to washers 65. A more detailed description of the elastomeric pucks and their method of dissipating energy will be hereinafter presented.

Rod assembly 45 (which constitutes a portion of frame 37) is shown, in FIG. 3, to comprise an outer tube 67, with the inner end of outer tube 67 abutting against the front face of front compression plate 61. An inner rod 69 is disposed within outer tube 67 and the inner rod 69 extends through the front compression plate 61, and through pucks 63 and washers 65. The rear end of inner rod 69 extends out through the above-noted center openings in rear compression plate 59 and a nut 71 is fixedly secured (i.e., welded), as indicated at 73, to the outer end of inner rod 69 in such manner that the nut bears against the outer face of rear compression plate 59. Central opening 53 in rear end cap 51 is of such size that there is adequate clearance between nut 71 and the rear end cap such that the nut and inner rod 69 are free to move in axial direction with respect to rear compression plate 59 and with respect to the rear end cap.

As best shown in FIG. 3, outer tube 67 of rod assembly 45 is split lengthwise therealong and a weld, as indicated at 75, positively joins outer tube 67 to the outer end of inner rod 69 such that the outer end of the outer tube and the inner rod move together as a unit. A common aperture 77 is provided through outer tube 67 and inner rod 69 such that pin 47 may be received therethrough so as to join the rod assembly to lugs 33.

In this manner, with cushioning apparatus 35 pivotally secured at one end to railway car 3 by means of diagonal strut mount 41 and pin 43, and with the other end of the cushioning apparatus 35 pivotally secured to vertical strut 7 by means of pin 47 connecting rod assembly 45 to lugs 33, it will be appreciated that upon either railway car 3 or the trailer T supported on hitch 1 experiencing a longitudinal load relative to the other, the longitudinal load will be transmitted between the railway car and the trailer primarily via cushioning apparatus 35. More particularly, in accordance with this invention, regardless of the direction of the longitudinal load or force between the railway car and the trailer (i.e., either in fore or aft direction relative to the railway car or in tension or compression relative to the cushioning apparatus), elastomeric pucks 63 will always be loaded in compression so as to deform a substantially uniform amount in porportion to the load thereby to cushion or dissipate the longitudinal loads between the railway car and the trailer so as to limit the force applied to the trailer kingpin below 210,000 pounds, as required by the AAR regulations.

As heretofore described, elastomeric pucks 63 are generally annular in plan view. As shown in FIG. 4, puck 63 has an outer circular peripheral wall 79 and a central puck opening therein, with the central puck opening being of substantially equal diameter to inner rod 69. An inner puck surface 83 bears against the outer surfaces of rod 69, and thus keeps the puck generally centered with respect to the inner rod. Beveled inner puck faces, as indicated at 85a, 85b, extend from inner puck surface 83 such that the inner puck surface 83 is of a relatively small surface area thereby to limit or to reduce friction of the puck on inner rod 69. Further, puck 63 has a pair of generally parallel circular faces 87 and 89 which constitutes load bearing compression faces. Surface 87 is shown to have a plurality of generally concentric ridges 88 thereon, while face 89 is relatively smooth. It will, however, be understood that ridges 88 are optional and may or may not be necessary or desirable. In this manner, by regulating the degree of roughness of one or both of the load bearing surfaces 87 and 89, it is possible to exercise a degree of control over the coefficient of friction between pucks 63 and washers 65 bearing thereagainst. Additionally, pucks 63 are treated so as to remove any mold release or other coatings which may be applied thereto during fabrication, and metallic washers 65 are preferably cleaned, as by sandblasting, so as to again ensure a clean mating surface between load bearing surfaces 87 and 89 of each of the pucks 63 and their corresponding washer faces. In this manner, the coefficient of friction between pucks 63 and washers 65 may be controlled so as to be within a desired range, which may range from about 0.1 to about 1.0. Those skilled in the art will appreciate that the coefficient of friction between pucks 63 and washers 65 deriving dynamic deformation of the pucks is difficult to measure. However, if the coefficient of friction is unduly low, too little energy dissipation will result. If the coefficient of friction is unduly high, fatigue induced wear (i.e., crumbing) of the elastomer may result.

Within the broader aspects of this invention, while pucks 63 are herein shown to be circular, annular members, it will be understood that pucks 63 may be of any desired cross section, such as rectangular or of other polygonal shape. However, the deformation shape factor of a circular, annular elastomer members (i.e., the ratio of the peripheral surface area of wall 79 of the puck relative to the load bearing areas 87 and 89 of the puck) generally indicates the efficiency of an elastomeric compression member to absorb energy. Such energy absorption is maximized for a circular-shaped puck. However, those skilled in the art will recognize that within the broader aspects of this invention, it may be even preferable to have cross sections for puck 63 other than circular.

Elastomeric pucks 63 may be made of any suitable compressible elastomeric material. However, pucks 63 herein described are made of a molded urethane material. Other elastomeric materials, including synthetic and natural rubbers, an annealed copolyester polymers, such as described in U.S. Pat. No. 4,198,037 (which is herein incorporated by reference), may be utilized within the broader aspects of this invention.

In operation, with hitch 1 and cushioning apparatus 35 of the present invention in its solid line position, as shown in FIG. 1, and with an over-the-road trailer T coupled to hitch head 11 by means of kingpin locking jaws 17 positively engaging the trailer kingpin K, longitudinal inertial loads may be readily transmitted between railway car 3 and the trailer via cushioning apparatus 35. More specifically, upon application of a longitudinal inertial load between the railway car and the trailer so as to exert a tension load on cushioning apparatus 37 (i.e., a load which tends to pull rod assembly 45 axially out of cylinder body 37), inner rod 69 is caused to move axially out of the cylinder body, and nut 71 bearing against the outer face of rear compression plate 59 causes compression loading of the entire stack of elastomeric pucks 63 with metal washers 65 interposed therebetween so as to substantially uniformly compress all of the elastomeric pucks 63 so as to decrease their thickness and so as to cause the pucks to deform radially outwardly between adjacent washers 65 toward the inner wall of cylinder 49. Likewise, upon application of a compression load to cushioning apparatus 35, which tends to drive rod assembly 45 axially inwardly into cylinder body 49, nut 71, carried on the outer end of inner rod 69, is free to move axially outwardly away from rear compression plate 59. However, inner end of outer rod 67 bears on the outer face of front compression plate 61 so as to effect movement of the front compression plate toward the rear compression plate thus uniformly compressing all of the elastomeric pucks 63 between the front and rear compression plates. Thus, regardless of whether a tension or compression load is applied to cushioning apparatus 35, the elastomeric pucks 63 are compressed in the same manner so as to cushion or dissipate the energy transmitted between the railway car and the trailer supported by hitch 1.

It will also be understood that there must be sufficient space between the outer peripheral edges 79 of pucks 63 and the inner surface of cylinder 49 so as to permit the elastomeric pucks to deform and to spread outwardly when under compression. It will also be understood that the generally triangular space (when viewed in cross section, as shown in FIG. 5) between diagonal faces 85a, 85b of the puck, and the corresponding adjacent surfaces of washers 65, provide additional space into which the elastomeric puck may expand.

In accordance with this invention, with pucks 63 interposed between washers 65, and with the compression load bearing faces 87 and 89 of pucks 63 being free of (i.e., not bonded to) the contacting faces of adjacent washers 65, the friction of the elastomeric puck relative to the washers is important so as to ensure that deformation of the elastomeric pucks results in a desired amount of energy cushioning or dissipation. If the coefficient of friction is too low, the surfaces 87 and 89 of the puck will slide on their respective washer faces relatively easily, thus minimizing the energy dissipated by the elastomeric members. On the other hand, if the coefficient of friction between the elastomeric puck and the washers is sufficiently high, relatively high shear forces will be present in the elastomeric members at the interface between the elastomeric member and the washers, which could result in rubbing or wear of the elastomeric member. The preferred range of the coefficient of friction between pucks 63 and washers 65 is set forth above. Those skilled in the art will appreciate that washers 65 must be of a material having sufficient tensile strength so as to withstand the radial frictional forces exerted by the pucks on opposite faces thereof.

Referring to Table I below, the travel of the cushioning unit (i.e., the movement of rod 45 relative to frame 37) is substantially linear with respect to increases in impact velocity when the cushioning apparatus 35 of the present invention cushions against either compression or tension loading. Likewise, the hitch forces applied to the diagonal strut 35 are substantially linear, both upon application of tension and compression loading. It will be further noted in FIG. 1, due to the horizontal offset distance D2 between the centerline between pins 23 and 25 of vertical struts 7 and pin 47 connecting cushioning unit 35 to the vertical strut assembly, vertical strut moves through a substantially equal angular arc or distance in both fore and aft directions upon the cushioning unit 35 being subjected to either a tension or compression impact load. Importantly, this results in hitch 1 acting against a trailer excursion of about the same magnitude in either fore or aft longitudinal direction upon longitudinal inertial forces of substantially equal magnitudes being exerted on the trailer in either longitudinal direction. It will be appreciated that the trucks of the railcar and the wheels of the trailer are supported on springs. This will result in some differences in cushion unit travel and the force put on the diagional strut when the car is impacted on its A end and on its B end.

As is conventional, the "B" end of a railway car is the end at which the handbrake is located. Generally hitch 1 is oriented on the car such that hitch head 11 faces the B end of the car with the slot 15 in the hitch head facing the A end of the car. Thus, the front end trailer T faces the B end of the car.

TABLE I

MAXIMUM IMPACT DATA
ELASTOMER-IN-COMPRESSION CUSHIONED HITCH

| Run No. | Impact Velocity MPH | Cush. Unit Travel, Inches | Diagonal Strut Force, 1000 Lbs. |
|---|---|---|---|
| | | A End Impacts | |
| 9785 | 4.0 | −2.5 | −86 |
| 9786 | 5.9 | −4.7 | −136 |
| 9787 | 7.8 | −6.5 | −198 |
| 9788 | 10.3 | −8.9 | −298 |
| | | B End Impacts | |
| 9789 | 3.5 | 1.6 | 72 |
| 9790 | 6.0 | 5.2 | 158 |
| 9791 | 8.3 | 7.4 | 240 |
| 9792 | 8.2 | 7.4 | 229 |
| 9793 | 10.3 | 9.4 | 337 |

While washers 65, as shown in FIG. 3, are sized to have a load bearing area substantially similar to the load bearing faces 87 and 89 of pucks 63 when the pucks are fully compressed within cushioning apparatus 35, it will be understood that the outer peripheral face 79 of each of the pucks may bulge out beyond the edges of washers 65, as shown in FIG. 6. In accordance with this invention, it will be understood that washers 65 may be made somewhat smaller than the cross sectional area of faces 87 and 89 of the pucks when the pucks are nearly fully compressed such that the puck faces 87 and 89, at least at their peripheral edges, extend out beyond washers 65 when a compressive load beyond a predetermined magnitude is applied to the pucks. By altering the cross sectional area of the pucks and the washers, an elastomeric compression spring may be provided, wherein the stiffness of the spring exhibits force/deflection relationships in which the amount of force dissipated increases with deflection. This allows the force/deflection curve to be altered to cause more energy to be absorbed for a given force and deflection merely by changing the proportions of the diameter of the puck relative to the diameters of the washers and by so sizing these parts so as to allow the elastomeric pucks to extend out beyond the edges of the washers during compression. This results in a modified pressure distribution within the elastomeric member, and changes the interface friction between the elastomeric puck and the washers. This feature may be utilized so as to design an elastomer-in-compression spring which more effectively dissipates energy.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. Cushioning apparatus for an over-the-road trailer hitch mounted on a railway car so as to cushion longitudinal loads transmitted between the railway car and an over-the-road trailer secured to said hitch, said trailer having a kingpin, said hitch comprising a generally vertical strut secured to said railway car, a hitch head carried by said vertical strut, said hitch head having means for locking said kingpin to said hitch head, said cushioning apparatus having one end thereof secured to said railway car and the other end thereof secured to said vertical strut with the cushioning apparatus being disposed so as to cushion said longitudinal loads, said cushioning apparatus comprising a frame, compressible elastomeric means carried by said frame for cushioning said longitudinal loads, and means interposed between said vertical strut and said frame for compressing said elastomeric means relative to said frame upon a longitudinal load in either fore or aft direction relative to said railway car being applied to said hitch, said elastomeric means comprising a plurality of generally annularly-shaped elastomeric plates, each having a center opening, an outer peripheral surface, a pair of generally flat planar, parallel load bearing faces for transmitting said compression force into said elastomeric plates, and a diagonal face extending between said center opening and a respective said load bearing face, said plurality of elastomeric plates alternating with a plurality flat, planar of non-compressible washers, preferably metal washers, with each load bearing face of each elastomeric plate frictionally engaging, but being unbonded relative to, a respective contiguous face of one of said washers, such that upon compression of said elastomeric plates between said washers, said load bearing faces of said elastomeric plates frictionally grip said washers so as to dissipate a desired amount of energy without undue wear of the elastomeric plates and such that said diagonal faces provide a sufficient volume adjacent said center opening for deformation of the elastomeric plates.

2. Cushioning apparatus as set forth in claim 1 wherein said vertical strut is pivotally secured to said railway car, wherein said hitch head is free to pivot, within a limited range, relative to said vertical strut about a horizontal axis transverse to the centerline of said railway car, and wherein said frame and said compressible elastomeric means are pivotally secured to said railway car and to said hitch.

3. Cushioning apparatus as set forth in claim 2 wherein with said hitch in a normal operating position such that an axis between said pivotal attachment of said vertical strut to said railway car and said pivotal attachment of said hitch head to said vertical strut is substantially vertical, the pivotal attachment of said cushioning apparatus relative to said vertical strut being offset from said vertical axis a predetermined distance such that a longitudinal load between said trailer and said railway car compressing said compressible apparatus effects pivoting movement of said vertical strut in fore and aft direction from said normal operating position a substantially equal distance in said fore and aft directions in response to substantially equal longitudinal loading thereof.

4. Cushioning apparatus as set forth in claim 1 wherein the cross section of said elastomeric plates relative to the cross section of said washers is such that upon compression of said cushioning apparatus beyond a predetermined limit, said elastomeric plates deform out beyond said washers.

5. A cushioning apparatus for an over-the-road trailer hitch mounted on a railway car so as to cushion longitudinal loads transmitted between the the railway car and an over-the-road trailer secured to said hitch, said trailer having a kingpin, said hitch comprising a generally vertical strut secured to said railway car, a hitch head carried by said vertical strut, said hitch head having means for locking said kingpin to said hitch head, said cushioning apparatus having one end thereof secured to said railway car and the other end thereof secured to said vertical strut with the cushioning apparatus being disposed so as to cushion said longitudinal loads, said cushioning apparatus comprising a frame, compressible elastomeric means carried by said frame for cushioning said longitudinal loads, and means interposed between said vertical strut and said frame for compressing said elastomeric means relative to said frame upon a longitudinal load in either fore or aft direction relative to said railway car being applied to said hitch, said elastomeric means comprising a plurality of generally annularly-shaped elastomeric plates, each having a center opening, an outer peripheral surface, and a pair of generally flat planar, parallel load bearing faces for transmitting said compression force into said elastomeric plates, and a diagonal face extending between said center opening and a respective said load bearing face said plurality of elastomeric plates alternating with a plurality flat, planar of non-compressible washers, preferably metal washers, with each load bearing face of each elastomeric plate frictionally engaging, but being unbonded relative to, a respective contiguous face of one of said washers, said frame comprising a rear abutment, a front abutment, and elongate means joining said front and rear abutments together, said elastomeric means being interposed between said front and rear abutment plates, a rear compression plate and said elastomeric means, a front compression plate interposed between the inner face of said front abutment plate and said elastomeric means, and means interconnecting said front and rear compression plates to said vertical strut for compressing said elastomeric means upon application of either a tension or compression longitudinal load to said cushioning apparatus, a rod assembly having an outer tube and an inner rod, said outer tube and inner rod being secured together so as to move as a unit, said outer tube having an inner end abutting against said front compression plate, said inner rod extending through said front compression plate, through said elastomeric members, and through said rear compression plate, said inner rod having a nut secured thereto so as to bear against the outer face of said rear compression plate, whereby, upon inward axial movement of said rod assembly relative to said elastomeric means, said outer rod bears against said front compression plate and effects uniform compression of said elastomeric means, and whereby, upon axial outward movement of said rod assembly relative to said elastomeric means, said nut bears against the outer face of said rear compression plate and effects uniform compression of said elastomeric means.

* * * * *

UNITED STATES PATENT AND TRADEMARK OFFICE
CERTIFICATE OF CORRECTION

PATENT NO. : 4,723,879

DATED : February 9, 1988

INVENTOR(S) : Jan D. Holt

It is certified that error appears in the above-identified patent and that said Letters Patent is hereby corrected as shown below:

Column 12, line 9, "the the" should read -- the --.

Column 12, line 42, "a rear compression plate and said elastomeric means" should read -- a rear compression plate interposed between the inner face of said rear compression plate --.

Signed and Sealed this

Second Day of August, 1988

Attest:

DONALD J. QUIGG

Attesting Officer

Commissioner of Patents and Trademarks